(12) United States Patent
Takeuchi

(10) Patent No.: US 9,873,302 B2
(45) Date of Patent: Jan. 23, 2018

(54) SHOCK ABSORBER

(71) Applicant: KAYABA INDUSTRY CO., LTD., Tokyo (JP)

(72) Inventor: Hideaki Takeuchi, Gifu (JP)

(73) Assignee: KYB Corporation, Tokyo (JP)

( * ) Notice: Subject to any disclaimer, the term of this patent is extended or adjusted under 35 U.S.C. 154(b) by 12 days.

(21) Appl. No.: 14/411,927

(22) PCT Filed: Jul. 17, 2013

(86) PCT No.: PCT/JP2013/069401
§ 371 (c)(1),
(2) Date: Dec. 30, 2014

(87) PCT Pub. No.: WO2014/021103
PCT Pub. Date: Feb. 6, 2014

(65) Prior Publication Data
US 2015/0165854 A1 Jun. 18, 2015

(30) Foreign Application Priority Data

Aug. 3, 2012 (JP) .................................. 2012-172728
Aug. 3, 2012 (JP) .................................. 2012-172729
Aug. 3, 2012 (JP) .................................. 2012-172730

(51) Int. Cl.
B60G 15/06 (2006.01)
F16F 1/12 (2006.01)
F16F 1/38 (2006.01)

(52) U.S. Cl.
CPC ......... *B60G 15/063* (2013.01); *B60G 15/062* (2013.01); *F16F 1/128* (2013.01);
(Continued)

(58) Field of Classification Search
CPC B60G 15/063; B60G 15/062; B60G 2202/31; B60G 2202/312;
(Continued)

(56) References Cited

U.S. PATENT DOCUMENTS 3,251,591 A * 5/1966 McNally .............. B60G 15/063
267/221
4,366,969 A * 1/1983 Benya .................. B60G 15/063
267/117

(Continued)

FOREIGN PATENT DOCUMENTS

CN 102686901 A 9/2012
JP 59-003033 U 1/1984
(Continued)

Primary Examiner — Melanie Torres Williams
(74) Attorney, Agent, or Firm — Rabin & Berdo, P.C.

(57) ABSTRACT

A shock absorber provided with a suspension spring, the shock absorber includes a tube whose lower end portion is joined to a vehicle axle side portion provided with a tire, and a lower spring bearing that is provided on an outer circumference of the tube and supports a lower end of the suspension spring. An increased diameter part is provided on the outer circumference of the tube above the lower spring bearing, the increased diameter part having an outer diameter larger than an outer diameter of the tube.

7 Claims, 9 Drawing Sheets

(52) U.S. Cl.
CPC ............ *F16F 1/38* (2013.01); *B60G 2202/31* (2013.01); *B60G 2202/312* (2013.01); *B60G 2204/1242* (2013.01); *B60G 2204/12422* (2013.01); *B60G 2204/4308* (2013.01); *B60G 2204/45* (2013.01); *B60G 2206/41* (2013.01); *B60G 2206/8201* (2013.01); *B60G 2206/821* (2013.01); *F16F 2230/007* (2013.01)

(58) Field of Classification Search
CPC .... B60G 2204/1242; B60G 2204/1422; B60G 2204/4308; B60G 2204/45
USPC .................................................. 267/220, 221
See application file for complete search history.

(56) References Cited

U.S. PATENT DOCUMENTS

| | | | |
|---|---|---|---|
| 2004/0119217 A1* | 6/2004 | Kon .................... | B60G 15/063 267/221 |
| 2007/0187197 A1 | 8/2007 | Imaeda et al. | |
| 2011/0204551 A1 | 8/2011 | Oishi et al. | |

FOREIGN PATENT DOCUMENTS

| | | | |
|---|---|---|---|
| JP | 09-013743 | A | 1/1997 |
| JP | 2005-220948 | A | 8/2005 |
| JP | 2007-040438 | A | 2/2007 |
| JP | 2007-040473 | A | 2/2007 |
| JP | 2007-192286 | A | 8/2007 |
| JP | 2007-211949 | A | 8/2007 |
| JP | 3157631 | U | 2/2010 |
| JP | 2010-247678 | A | 11/2010 |
| JP | 2011-174531 | A | 9/2011 |
| JP | 2012-145038 | A | 8/2012 |

* cited by examiner

SHOCK ABSORBER

TECHNICAL FIELD

The present invention relates to a shock absorber, and in particular to a shock absorber that is provided with a suspension spring and composes a suspension of a vehicle.

BACKGROUND ART

A shock absorber composing a suspension of a vehicle is provided in a wheelhouse of the vehicle. An upper end portion of the shock absorber is joined to a vehicle body side portion of the vehicle, whereas a lower end portion of the shock absorber is joined to a vehicle axle side portion of the vehicle.

When providing the shock absorber in the wheelhouse, the shock absorber is positioned behind a tire, that is to say, in an upper back side of the wheelhouse, so as to avoid interference of the shock absorber with the tire as disclosed in, for example, JP 2010-247678A.

SUMMARY OF INVENTION

However, in recent years, there is a tendency to lower a heightwise position of a hood in terms of, for example, vehicle safety in collision. Accordingly, an upper end position of a wheelhouse is becoming low. Therefore, a heightwise position in which a shock absorber is provided is becoming low compared to conventional cases. As a result, there is a tendency to position a lower end portion of a suspension spring, which is wound around the shock absorber, behind a tire.

Even if the lower end portion of the suspension spring is positioned behind the tire, there is no possibility that the lower end portion of the suspension spring interferes with the tire while the shock absorber is in a normal operation state. However, for example, if the suspension spring rusts after prolonged use of the vehicle over serviceable years, there is a possibility that the rusted lower end portion of the suspension spring breaks due to an action of an unexpected external force applied to the shock absorber. In this case, a lower end portion of the broken suspension spring could possibly interfere with and damage the tire.

It is an object of the present invention to provide a shock absorber with which, even if a lower end portion of a suspension spring breaks, interference of a lower end portion of the broken suspension spring with a tire can be avoided.

According to one aspect of the present invention, a shock absorber provided with a suspension spring, the shock absorber includes a tube whose lower end portion is joined to a vehicle axle side portion provided with a tire, and a lower spring bearing that is provided on an outer circumference of the tube and supports a lower end of the suspension spring. An increased diameter part is provided on the outer circumference of the tube above the lower spring bearing, the increased diameter part having an outer diameter larger than an outer diameter of the tube.

DESCRIPTION OF EMBODIMENTS

The following describes embodiments of the present invention with reference to the drawings.

First Embodiment

A shock absorber 100 according to a first embodiment of the present invention will now be described with reference to FIGS. 1 to 4.

Figure 1:
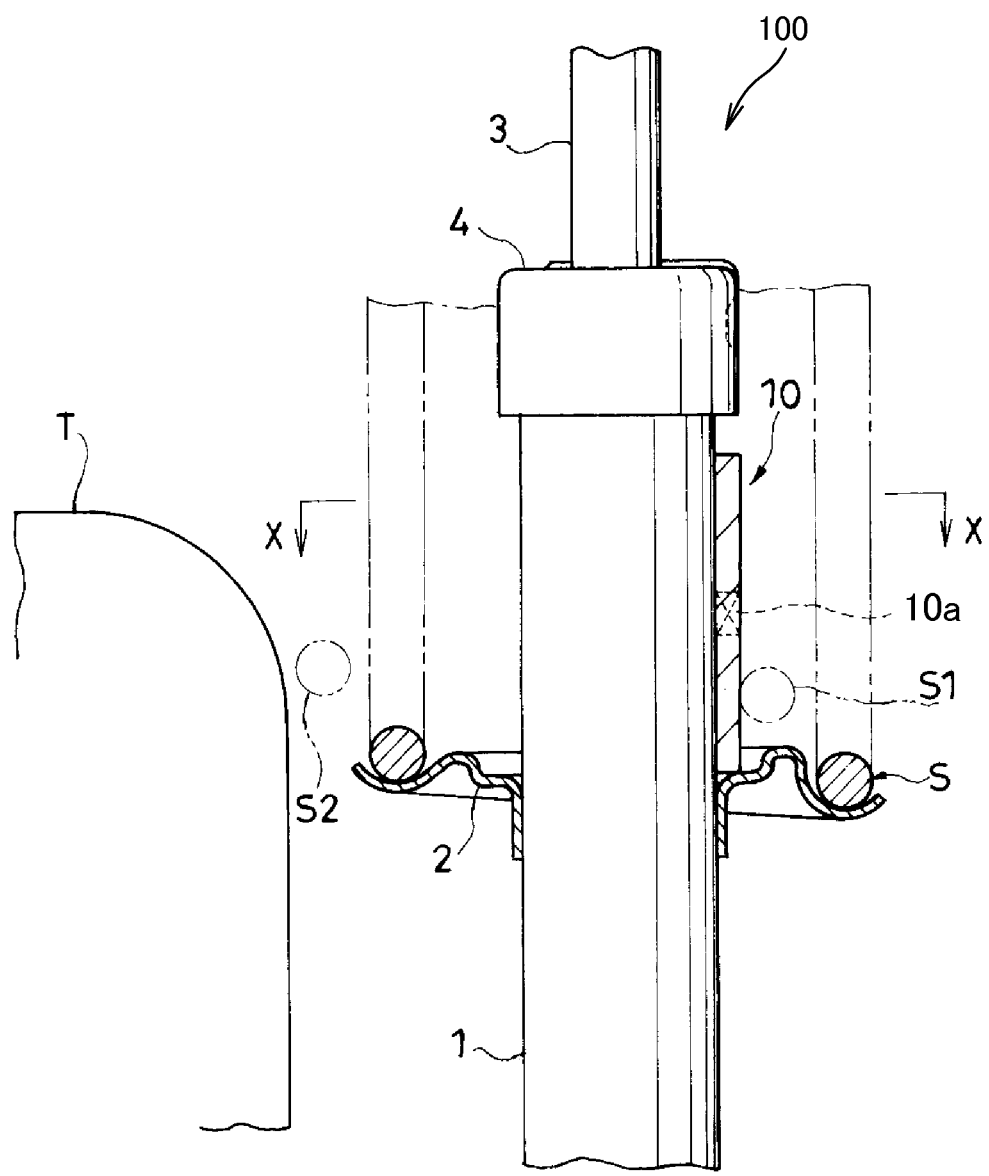
FIG. 1 is a partial side view of a shock absorber according to a first embodiment of the present invention.

As shown in FIG. 1, the shock absorber 100 includes a tube 1, a lower spring bearing 2, and a suspension spring S. A lower end portion of the tube 1 is joined to a vehicle axle side portion provided with a tire T. The lower spring bearing 2 is provided on an outer circumference of the tube 1. A lower end of the suspension spring S is supported by the lower spring bearing 2.

In the present embodiment, the shock absorber 100 is of a multi-tube type. The tube 1 is an outer tube. A cylinder is provided inside the tube 1. A piston rod 3 is slidably inserted into the cylinder. An upper end side of the piston rod 3 projects upward from an upper end portion of the tube 1.

The tube 1 is composed as a lower end side member, and is joined to a vehicle axle side portion of a vehicle via, for example, a knuckle bracket (not shown). The piston rod 3 is composed as an upper end side member, and is joined to a vehicle body side portion of the vehicle via, for example, a mount (not shown).

A cap-shaped bump stopper 4 is provided on the upper end portion of the tube 1. A cross-section of the bump stopper 4 has a downward facing squared U-shape. The piston rod 3 penetrates through a hole formed in a shaft core region of an upper end portion of the bump stopper 4.

A gap is formed between the hole formed in the shaft core region of the bump stopper 4 and the piston rod 3. Via this gap, dust accumulated on an upper end of the bump stopper 4 is discharged toward a downward side of the bump stopper 4.

On the upper end portion of the tube 1 at an inner side of the bump stopper 4, a rod guide and a seal member held by the rod guide are provided at an inner side. The rod guide guides a relative axial movement of the piston rod 3 with respect to the tube 1. The seal member seals between the piston rod 3 and the tube 1.

The inside of the cylinder of the shock absorber 100 is partitioned into two pressure chambers by a piston provided to an end portion of the piston rod 3. The piston is provided with a damping force generation element that applies resistance to a working fluid that moves back and forth between the two pressure chambers in accordance with a movement of the piston rod 3. In this way, in the shock absorber 100, the damping force generation element exerts a damping action when the piston rod 3 proceeds into and recedes from the tube 1.

As the shock absorber 100 is of a multi-tube type, the lower spring bearing 2 is fixed to the outer circumference of the tube 1 by welding. The suspension spring S, whose lower end is supported by the lower spring bearing 2, is formed by a coil spring, which is a compression spring. The coil spring is made of metal.

An upper end of the suspension spring S is engaged with to an upper spring bearing that is positioned below the mount and provided to an upper end portion of the piston rod 3. Therefore, the suspension spring S provided between the lower spring bearing 2 and the upper spring bearing elastically supports a vehicle body of the vehicle with an extensional pushing force.

The lower end of the suspension spring S is not ground for the following reason: a lower end portion of the suspension spring S has a higher strength against breakage when the lower end of the suspension spring S is not ground than when the lower end of the suspension spring S is ground. However, the present embodiment is not intended to exclude the suspension spring S with a ground lower end.

Figure 2:
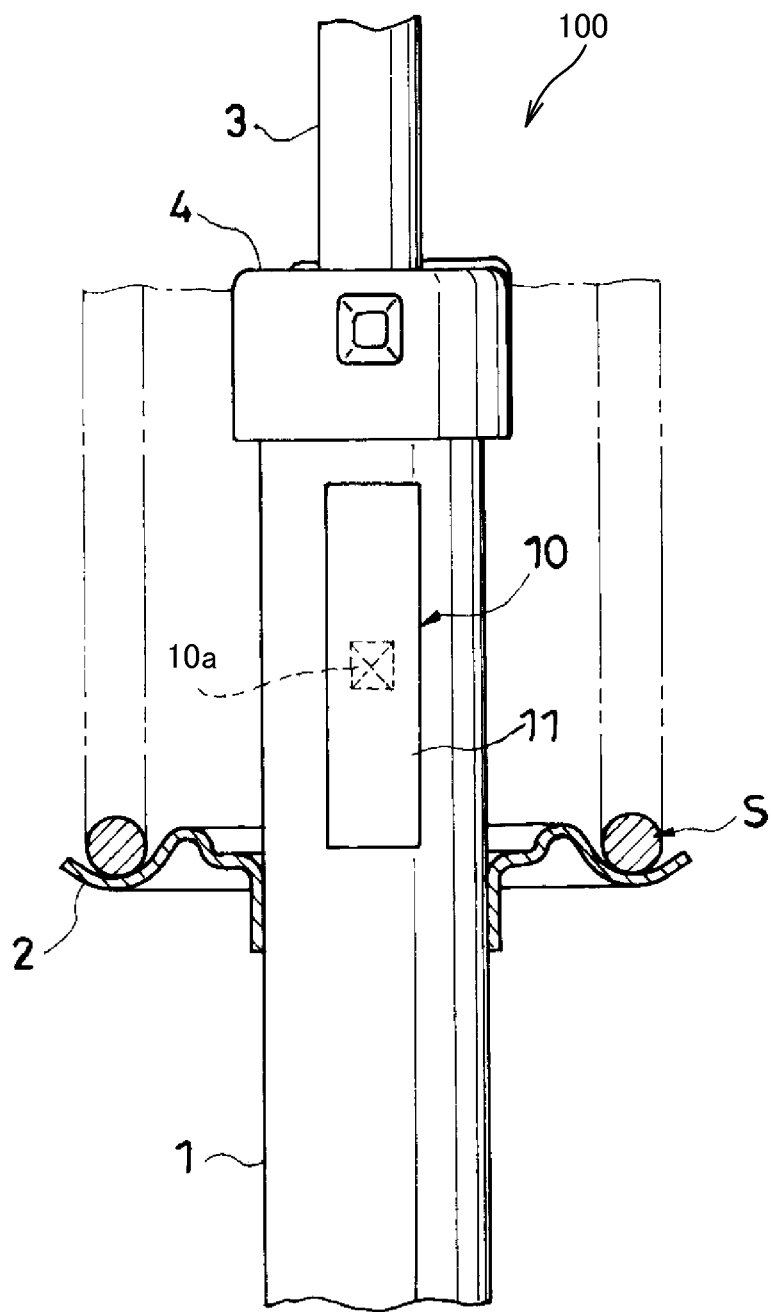
FIG. 2 is a partial front view of the shock absorber according to the first embodiment of the present invention.

As shown in FIGS. 1 and 2, a spacer member 10 that serves as an increased diameter part is provided on the outer circumference of the tube 1 of the shock absorber 100, specifically, on an outer circumferential surface of the tube 1 above the lower spring bearing 2. The spacer member 10 has an outer diameter larger than an outer diameter of the tube 1. The spacer member 10 is a plate-like member that is provided on, out of the outer circumferential surface of the tube 1, a surface at a side opposite to a surface opposing the tire T, that is to say, a surface of the tube 1 at a front side, which is a right side in FIG. 1.

A hose bracket and the like, not shown, are generally provided on the outer circumferential surface of the tube 1 at the front side. As the spacer member 10 is provided on the outer circumferential surface of the tube 1 at the front side, the hose bracket and the like can be provided on the basis of the spacer member 10. In other words, in a case where the hose bracket and the like are provided on the outer circumferential surface of the tube 1 at the front side, the spacer member 10 can be provided on the outer circumferential surface of the tube 1 at the front side on the basis of the hose bracket and the like.

Here, in a case where the suspension spring S is shortened due to breakage of the lower end portion thereof for some reason and the lower end of the suspension spring S is separated from the lower spring bearing 2, there is a possibility that the suspension spring S moves toward the tire T. Upon the occurrence of this situation, as indicated by a line with alternate long and two short dashes in FIG. 1, the spacer member 10 comes into contact with a lower end portion S1 of the broken suspension spring S, thereby preventing the suspension spring S from moving further toward the tire T.

As the spacer member 10 thus prevents a movement of the lower end portion S1 of the broken suspension spring S, a lower end portion S2 of the broken suspension spring S at a side opposing the tire T is prevented from moving further toward the tire T. In this way, interference of the lower end portion S2 of the broken suspension spring S with the tire T is avoided.

To explain in detail, if the lower end portion of the suspension spring S breaks due to rust and the like, the suspension spring S is shortened accordingly, resulting in a situation where the suspension spring S is no longer seated on the lower spring bearing 2. In this case, the lower end portion S1 of the broken suspension spring S becomes movable in a radial direction of the tube 1.

Should the lower end portion S2 of the broken suspension spring S move toward and interfere with the tire T, there is a possibility that the tire T is damaged. However, a movement of the lower end portion S1 of the broken suspension spring S toward the tire T is prevented by the spacer member 10 that is provided on, out of the outer circumferential surface of the tube 1, a surface at a side opposite to a surface opposing the tire T. Therefore, interference of the lower end portion S2 of the broken suspension spring S with the tire T is avoided.

The spacer member 10 may be configured arbitrarily, as long as it prevents the broken lower end portion S1 of the suspension spring S from moving toward the tire T.

The spacer member 10 is formed as a plate-like member provided on the outer circumferential surface of the tube 1. For example, the spacer member 10 has an appropriate wall thickness larger than a wall thickness of the tube 1, and is formed as a narrow strip along an axial direction of the tube 1 (see FIG. 1). Also, a width of the spacer member 10 is smaller than a horizontal width of the tube 1 as viewed from the front (see FIG. 2). Furthermore, the spacer member 10 is formed in such a manner that a transverse cross-section thereof along a direction traversing an axis of the tube 1 has a shape of a substantial rectangle that is curved along the outer circumferential surface of the tube 1 (see FIG. 3).

As the spacer member 10 is formed into a shape of a plate along the axial direction of the tube 1, it is easy to provide the spacer member 10 on the outer circumferential surface of the tube 1. The spacer member 10 can also be provided easily on an outer circumference of a tube of an existing shock absorber as an add-on.

A dimension of the wall thickness, i.e., a plate thickness of the spacer member 10 is such that, even if the lower end portion S1 of the broken suspension spring S moves in the radial direction of the tube 1, interference of the lower end portion S2 of the broken suspension spring S with the tire T can be avoided. Specifically, an optimal numerical value is selected thereas based on the outer diameter of the tube 1 and on a winding diameter and wire diameter of the suspension spring S. Incidentally, the dimension of the plate thickness of the spacer member 10 needs to be set such that an inner circumference of the suspension spring S does not interfere with an outer circumference of the spacer member 10 while the suspension spring S is in a normal state.

Figure 3:
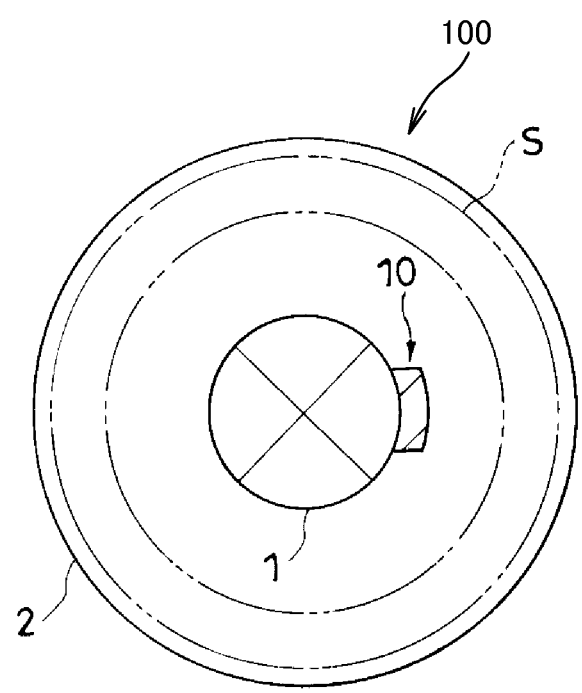
FIG. 3 is a cross-sectional view along the line X-X of FIG. 1.

With regard to the shape of the transverse cross-section of the spacer member 10, as shown in FIG. 3, the outer circumference of the spacer member 10 is formed in such a manner that an outer diameter thereof is larger than the outer diameter of the tube 1, and it is curved to be concentric with the suspension spring S. However, in terms of prevention of a further movement of the lower end portion S1 of the broken suspension spring S by contact therewith, the outer circumference of the spacer member 10 may be formed flat instead of being curved.

As a back surface of the spacer member 10 is provided on the outer circumferential surface of the tube 1, it is preferable to form the back surface of the spacer member 10 as a curved surface that is circumferentially curved to conform to the outer circumferential surface of the tube 1. However, in terms of joining of the spacer member 10 to the outer circumferential surface of the tube 1, it is not essential to form the back surface of the spacer member 10 as a curved surface conforming to the outer circumference of the tube 1, as long as the joint is ensured.

As the shock absorber is of a multi-tube type and the tube 1 is made of metal, the spacer member 10 is fixed to the outer circumferential surface of the tube 1 by welding. However, the spacer member 10 is not limited to being fixed to the outer circumferential surface of the tube 1 by welding, and may be fixed thereto using an arbitrary means.

As the spacer member 10 is welded to the outer circumferential surface of the tube 1, the spacer member 10 is stably fixed to the outer circumferential surface of the tube 1, and a fixed state thereof is permanently maintained. Spot welding may be used as a method of fixing the spacer member 10 to the outer circumferential surface of the tube 1.

In a case where the spacer member 10 is welded to the outer circumferential surface of the tube 1 before fixing the lower spring bearing 2, the spacer member 10 serves as a benchmark for setting a fixture position of the lower spring bearing 2 when fixing the lower spring bearing 2 to the tube 1.

On the other hand, in a case where the lower spring bearing 2 is fixed to the outer circumferential surface of the tube 1 first, a fixture position of the spacer member 10 can be set by making a lower end of the spacer member 10 come into contact with the lower spring bearing 2. In addition, when welding the spacer member 10 to the outer circumferential surface of the tube 1, the problem of a movement of the spacer member 10 can be alleviated.

Conversely, in a case where the spacer member 10 is fixed to the outer circumferential surface of the tube 1 first, the fixture position of the lower spring bearing 2 can be set by making the lower spring bearing 2 come into contact with the lower end of the spacer member 10. In addition, when welding the lower spring bearing 2 to the outer circumferential surface of the tube 1, the problem of a movement of the lower spring bearing 2 can be alleviated.

It is just sufficient for the spacer member 10 to exert a function of preventing a further movement of the broken lower end portion S1 of the suspension spring S by contact therewith. Therefore, for example, the spacer member 10 may be provided with a cutaway part 10a that is formed by removing the wall thickness in a middle part, as indicated by a dash line in FIGS. 1 and 2. In this way, the component weight can be reduced.

The cutaway part 10a may be a part that undergoes welding. Also, the cutaway part 10a may be used as a socket for a jig when welding the spacer member 10 to the outer circumferential surface of the tube 1.

In FIGS. 1 and 2, the spacer member 10 is provided across a substantially entire length from the lower spring bearing 2 to the bump stopper 4 provided on the upper end portion of the tube 1. However, in terms of prevention of a movement of the lower end portion S1 of the broken suspension spring S toward the tire T, the spacer member 10 may be formed to be smaller in length than is illustrated. Specifically, the spacer member 10 may be formed such that a position of an upper end thereof is lower than is illustrated. In this way, the component weight can be reduced.

It is just sufficient for the spacer member 10 to exert a predetermined function in an emergency. Therefore, in a case where the shock absorber 100 is of a multi-tube type, as the spacer member 10 is provided on the outer circumferential surface of the tube 1 serving as the outer tube that can avoid a temperature increase, the spacer member 10 may be made of, for example, hard synthetic resin instead of metal.

In a case where the spacer member 10 is made of synthetic resin, the weight of the spacer member 10 can be reduced, and the spacer member 10 can be fixed to the outer circumferential surface of the tube 1 using an adhesive agent.

The following describes modification examples of the above-described first embodiment.

In terms of weight, the spacer member 10 may be shaped as shown in FIGS. 4A to 4D.

Figure 4A:
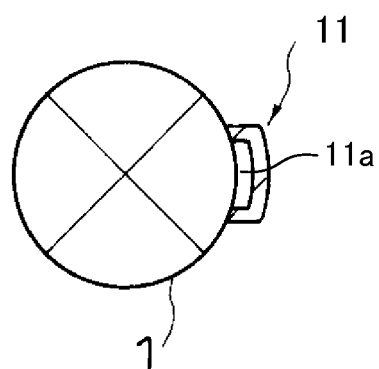
FIG. 4A is a cross-sectional view showing a modification example of the shock absorber according to the first embodiment of the present invention.

A transverse cross-section of a spacer member 11 shown in FIG. 4A has a squared U-shape. A flow path 11a is formed between the spacer member 11 and the tube 1. An exterior of the spacer member 11 is similar to that of the spacer member 10. With the spacer member 11, water, mud, and the like on an upper end of the spacer member 11 can be discharged via the flow path 11a. Therefore, deposition of water, mud, and the like on the upper end of the spacer member 11 can be blocked.

Figure 4B:
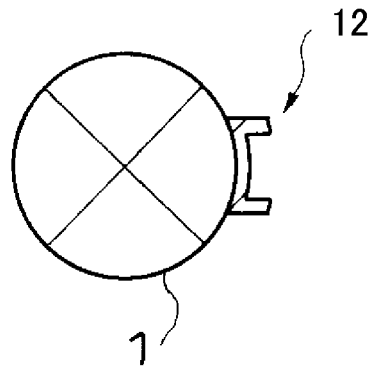
FIG. 4B is a cross-sectional view showing a modification example of the shock absorber according to the first embodiment of the present invention.

A transverse cross-section of a spacer member 12 shown in FIG. 4B has an outward facing concave shape. This is similar to a case in which two ribs along the axial direction of the tube 1 are provided on the outer circumferential surface of the tube 1. With the spacer member 12 also, deposition of water, mud, and the like on an upper end of the spacer member 12 can be blocked.

Figure 4C:
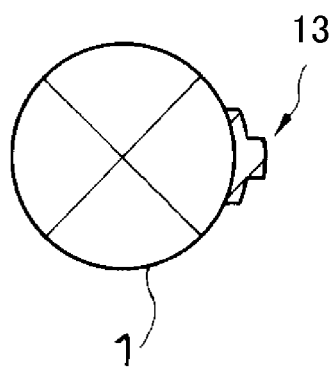
FIG. 4C is a cross-sectional view showing a modification example of the shock absorber according to the first embodiment of the present invention.

A transverse cross-section of a spacer member 13 shown in FIG. 4C has an outward facing convex shape. This is similar to a case in which one rib along the axial direction of the tube 1 is provided on the outer circumferential surface of the tube 1. With the spacer member 13, a surface that comes into contact with the suspension spring S can be reduced, and an exterior of the tube 1 can be simplified compared to the spacer member 10.

Figure 4D:
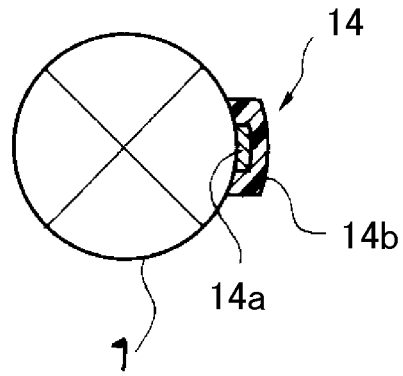
FIG. 4D is a cross-sectional view showing a modification example of the shock absorber according to the first embodiment of the present invention.

A spacer member 14 shown in FIG. 4D is configured in such a manner that a pillow body 14b made of resin is held by a metal core 14a provided on the tube 1. An exterior of the spacer member 14 is similar to that of the spacer member 10. With the spacer member 14, the materials thereof are low in cost, and therefore the component cost of the spacer member can be suppressed.

In the above-described first embodiment, the suspension spring S is wound such that it does not have an inclined orientation with respect to the shock absorber 100. Alternatively, the suspension spring S may be wound such that it has an inclined orientation with respect to the shock absorber 100. In this case also, the spacer member can prevent the lower end portion S1 of the broken suspension spring S from moving toward the tire T.

In the above-described first embodiment, the lower end of the suspension spring S comes into direct contact with the lower spring bearing 2. Alternatively, a rubber sheet may be provided between the lower end of the suspension spring S and the lower spring bearing 2. In this case, rusting of the lower end of the suspension spring S, which could possibly occur due to direct contact between the lower end of the suspension spring S and the lower spring bearing 2, can be suppressed as much as possible, and impact therebetween can be absorbed. As a result, the occurrence of impact noise can be reduced.

In the above-described first embodiment, the shock absorber 100 is of a multi-tube type. Alternatively, the shock absorber 100 may be of a single-tube type.

The foregoing first embodiment achieves the following effects.

The spacer member 10 is provided on, out of the outer circumferential surface of the tube 1, a surface at a side opposite to a surface opposing the tire T above the lower spring bearing 2. Therefore, even if the lower end portion S1 of the broken suspension spring S attempts to move toward the tire T, the lower end portion S1 of the broken suspension spring S comes into contact with the spacer member 10 and is prevented from moving toward the tire T. Consequently, interference of the lower end portion S1 of the broken suspension spring S with the tire T is avoided.

Second Embodiment

A shock absorber 200 according to a second embodiment of the present invention will now be described with reference to FIGS. 5 to 8. In the present second embodiment, constituents that are the same as those of the shock absorber 100 according to the above-described first embodiment are given the same reference signs thereas in the drawings, and a description thereof is omitted. The following describes differences from the above-described first embodiment.

Figure 5:
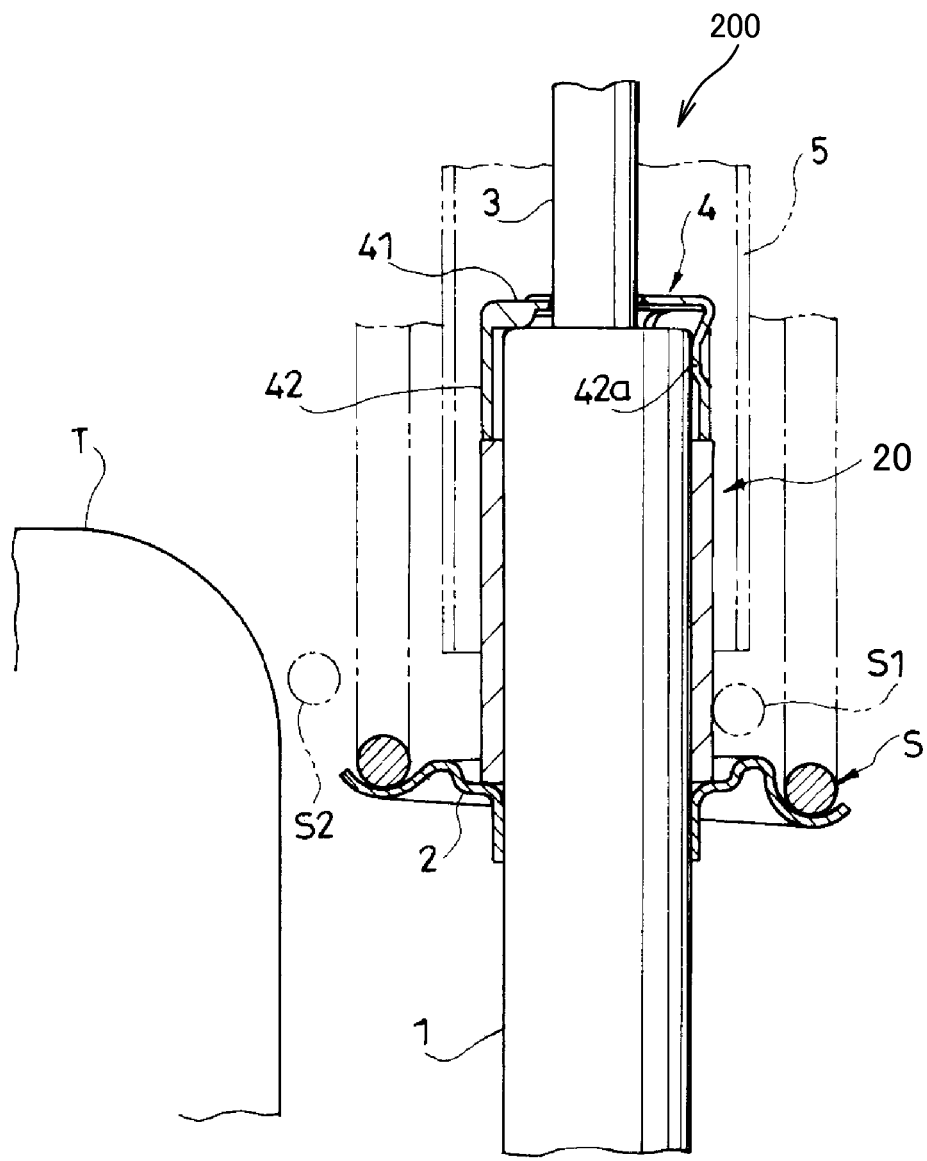
FIG. 5 is a partial side view of a shock absorber according to a second embodiment of the present invention.

As shown in FIG. 5, an increased diameter member 20 that serves as an increased diameter part is provided on an outer circumference of a tube 1 of the shock absorber 200, specifically, on an outer circumferential surface of the tube 1 above a lower spring bearing 2. The increased diameter member 20 has an outer diameter larger than an outer diameter of the tube 1. In a case where a suspension spring S is shortened due to breakage of a lower end portion thereof for some reason and moves toward a tire T, the increased diameter member 20 comes into contact with a lower end portion S1 of the broken suspension spring S as indicated by a line with alternate long and two short dashes in FIG. 5, thereby preventing the suspension spring S from moving further toward the tire T.

As the increased diameter member 20 thus prevents a movement of the lower end portion S1 of the broken suspension spring S, a lower end portion S2 of the broken suspension spring S at a side opposing the tire T is prevented from moving further toward the tire T. In this way, interference of the lower end portion S2 of the broken suspension spring S with the tire T is avoided.

The increased diameter member 20 may be configured arbitrarily, as long as it prevents the broken lower end portion S1 of the suspension spring S from moving toward the tire T.

The increased diameter member 20 is a tubular member formed along an axial direction of the tube 1. The increased diameter member 20 is made of synthetic resin for the purpose of reducing the component weight and the component cost compared to an increased diameter member made of metal.

For example, the increased diameter member 20 has an appropriate wall thickness larger than a wall thickness of the tube 1, and is formed along the axial direction of the tube 1. The increased diameter member 20 is formed so as to surround an entirety of the outer circumference of the tube 1.

As the increased diameter member 20 is the tubular member along the axial direction of the tube 1, the increased diameter member 20 can be provided on the outer circumference of the tube 1 by making the tube 1 penetrate through the inside of the increased diameter member 20. Also, as the increased diameter member 20 is the tubular member, there is no need to worry about mistakenly arranging the increased diameter member 20 upside down when providing the increased diameter member 20 on the outer circumference of the tube 1. Furthermore, as the increased diameter member 20 is the tubular member, the increased diameter member 20 does not have a directional property in a circumferential direction, and an operation of providing the increased diameter member 20 on the outer circumference of the tube 1 is easy.

As indicated by a line with alternate long and two short dashes in FIG. 5, a lower end portion of a dust cover 5 is positioned at an inner side of the suspension spring S. In view of this, the increased diameter member 20 functions so as to narrow a clearance between the tube 1 and the dust cover 5. Therefore, by providing the increased diameter member 20, it is possible to suppress external dust from entering.

The increased diameter member 20 is pressed onto the outer circumferential surface of the tube 1 and held between the lower spring bearing 2 and a bump stopper 4. However, an arbitrary means can be used as a method of fixing the increased diameter member 20 to the outer circumferential surface of the tube 1.

The bump stopper 4 includes a discoid stopper part 41 and a tubular barrel part 42 that hangs perpendicularly from the stopper part 41. The barrel part 42 includes projections 42a that are formed at a predetermined interval in a circumferential direction and project toward a center. The bump stopper 4 is pressed onto an upper end portion of the tube 1 in a state where distal ends of the projections 42a are in contact with the outer circumferential surface of the upper end portion of the tube 1.

As the increased diameter member 20 is held between the lower spring bearing 2 and the bump stopper 4, the increased diameter member 20 is stably fixed to the outer circumferential surface of the tube 1, and a fixed state thereof is permanently maintained.

In a case where the increased diameter member 20 does not easily move relative to the tube 1 due to, for example, vibration at the time of operation of the shock absorber 200, the increased diameter member 20 may be provided without being held between the lower spring bearing 2 and the bump stopper 4.

The increased diameter member 20 may be formed as a sectional type whereby it is circumferentially divided into two pieces. In this case, the increased diameter member 20 can be provided on an outer circumference of a tube of an existing shock absorber as an add-on.

A dimension of the wall thickness of the increased diameter member 20 is such that, even if the lower end portion S1 of the broken suspension spring S moves in a radial direction of the tube 1, interference of the lower end portion S2 of the broken suspension spring S with the tire T can be avoided. Specifically, an optimal numerical value is selected thereas based on the outer diameter of the tube 1 and on a winding diameter and wire diameter of the suspension spring S. Incidentally, the dimension of a plate thickness of the increased diameter member 20 needs to be set such that an inner circumference of the suspension spring S does not interfere with an outer circumference of the increased diameter member 20 while the suspension spring S is in a normal state.

Figure 6:
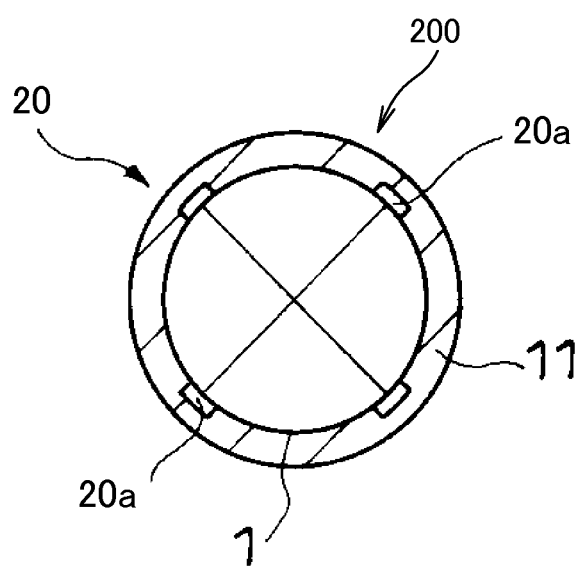
FIG. 6 is a transverse cross-sectional view of a tube and an increased diameter member.

With regard to the shape of a transverse cross-section of the increased diameter member 20, as shown in FIG. 6, the outer circumference of the increased diameter member 20 is formed in such a manner that an outer diameter thereof is larger than the outer diameter of the tube 1, and it is curved to be concentric with the suspension spring S. However, in terms of prevention of a further movement of the lower end portion S1 of the broken suspension spring S by contact therewith, an outer circumferential surface of the increased diameter member 20 is not limited to being a circumferential surface, and may be formed as a surface with circumferentially continuous waves, or as a polygonal surface composed of a plurality of flat surfaces. In a case where the outer circumferential surface of the increased diameter member 20 is formed into a shape other than a circumferential surface, an exterior of the tube 1 can be formed in a hobby-oriented manner.

Considering that the increased diameter member 20 is provided on the outer circumference of the tube 1, it is preferable to form an inner circumference of the increased diameter member 20 as a circumferential surface so as to conform to the outer circumferential surface of the tube 1. However, in a case where an inner circumferential surface of the increased diameter member 20 is in tight contact with the outer circumferential surface of the tube 1, there is a possibility that rainwater and the like remain between the outer circumferential surface of the tube 1 and the inner circumferential surface of the increased diameter member 20. This is not preferable in terms of protection against rusting of the tube 1.

In view of this, as shown in FIG. 6, drain ditches 20a are formed on the inner circumferential surface of the increased diameter member 20 at a predetermined interval in a circumferential direction. The drain ditches 20a communicate with an inner side of the bump stopper 4 arranged at an upward side. Rainwater and mud that fall from the inner side of the bump stopper 4 onto an upper end of the increased diameter member 20 are discharged via the drain ditches 20a.

In a case where the increased diameter member 20 is provided on the outer circumference of the tube 1 before fixing the lower spring bearing 2, the increased diameter member 20 serves as a benchmark for setting a fixture position of the lower spring bearing 2 when fixing the lower spring bearing 2 to the tube 1.

On the other hand, in a case where the lower spring bearing 2 is fixed to the outer circumferential surface of the tube 1 first, the lower spring bearing 2 serves as a benchmark for setting a fixture position of the increased diameter member 20 when providing the increased diameter member 20 on the outer circumference of the tube 1.

As the increased diameter member 20 is made of synthetic resin and supported by the lower spring bearing 2, even if the increased diameter member 20 is formed to be long within a range of manufacturing error, the bump stopper 4 can be pressed onto the upper end portion of the tube 1 due to elastic deformation of the increased diameter member 20. In this way, the bump stopper 4 can be pressed onto the upper end portion of the tube 1 unless the increased diameter member 20 is formed to be significantly longer than a set dimension.

In FIG. 5, the increased diameter member 20 is provided across a substantially entire length from the lower spring bearing 2 to the bump stopper 4. However, in terms of prevention of a movement of the lower end portion S1 of the broken suspension spring S toward the tire T, the increased diameter member 20 may be formed to be smaller in length than is illustrated. Specifically, the increased diameter member 20 may be formed such that a position of the upper end thereof is lower than is illustrated. In this way, the component weight can be reduced. In a case where the increased diameter member 20 is formed to have a short length, the increased diameter member 20 is fixed to the outer circumference of the tube 1 using an adhesive agent.

The following describes modification examples of the above-described second embodiment.

Figure 7:
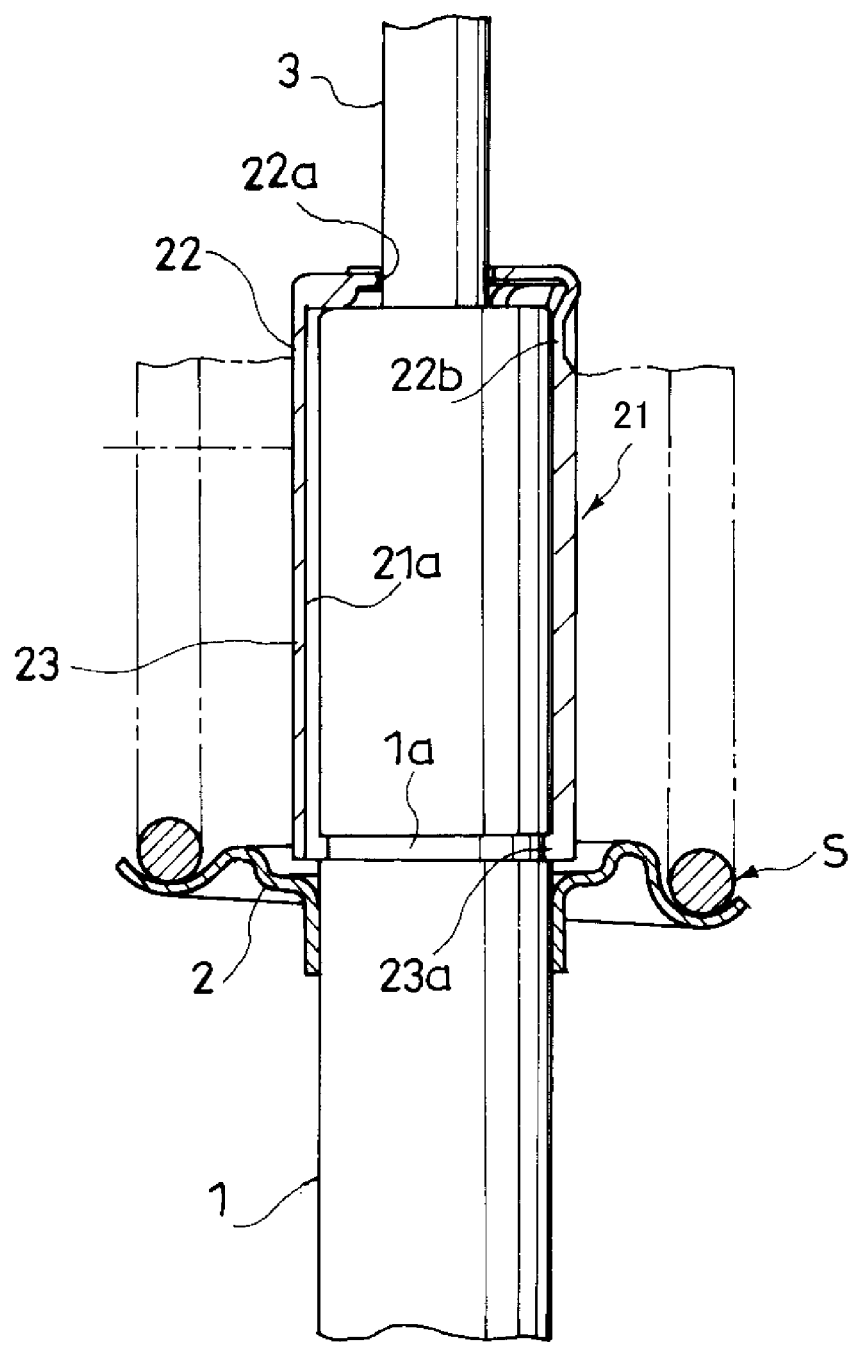
FIG. 7 is a partial side view of a shock absorber according to a modification example of the second embodiment of the present invention.

As shown in FIG. 7, an increased diameter member 21 is formed as a modified form of the bump stopper 4 (see FIG. 5). Specifically, the increased diameter member 21 is a bottomed tubular part formed along the axial direction of the tube 1. As the increased diameter member 21 is a bottomed tubular member, the bump stopper 4 made of metal can be omitted, and provision of the increased diameter member 21 does not lead to an increase in the number of components.

As the increased diameter member 21 is made of synthetic resin, the component weight and the component cost can be suppressed compared to the bump stopper 4 made of metal, and also compared to a case in which the increased diameter member 20 is provided together with the bump stopper 4 made of metal.

The increased diameter member 21 includes a head part 22 that is equivalent to the bump stopper 4 shown in FIG. 5, and a main body part 23 that hangs perpendicularly from the head part 22 in an integrated manner. A hole 22a is formed in a shaft core region of the head part 22. The piston rod 3 penetrates through the hole 22a.

Similarly to the bump stopper 4, the head part 22 is formed by having a tubular barrel part hung perpendicularly from a discoid stopper part. The barrel part includes projections 22b that are formed at a predetermined interval in a circumferential direction and project toward a center. The barrel part is pressed onto the upper end portion of the tube 1 in a state where distal ends of the projections 22b are in contact with the outer circumferential surface of the upper end portion of the tube 1.

The main body part 23 is arranged so as to extend, in a tubular form, from the barrel part of the head part 22. The main body part 23 is formed in such a manner that an inner circumferential surface thereof is in tight contact with the outer circumferential surface of the tube 1. In view of this, a plurality of drain ditches 21a are formed on the inner circumferential surface of the main body part 23. The drain ditches 21a are intended to discharge, to the outside, rainwater and mud from an inner side of the head part 22 arranged at an upward side. The drain ditches 21a are formed at a predetermined interval in a circumferential direction. Rainwater and mud that have entered the inner side of the head part 22 are discharged via the drain ditches 21a to the outside below the main body part 23.

The increased diameter member 21 exerts a function similar to that of the increased diameter member 20 shown in FIG. 5.

As the increased diameter member 21 is the bottomed tubular member, the increased diameter member 21 can be provided so as to surround the outer circumference of the tube 1 above the lower spring bearing 2 by making the piston rod 3 penetrate through the hole 22a in the shaft core region of the head part 22 and by inserting the tube 1 inside the main body part 23.

As the increased diameter member 21 is the bottomed tubular member, the increased diameter member 21 can be provided on the outer circumference of the tube 1 by inserting and positioning the tube 1 inside the increased diameter member 21. In this way, the head part 22 of the increased diameter member 21 is pressed onto the upper end portion of the tube 1. Meanwhile, compared to a case in which the head part 22 is the bump stopper 4 made of metal, there is a possibility that the increased diameter member 21 is not maintained at a predetermined fixture position due to, for example, vibration during operation of the shock absorber 200.

In view of this, it is preferable to join the increased diameter member 21 to the tube 1. Specifically, as shown in FIG. 7, an annular projection 23a is formed on an inner side of a lower end portion of the main body part 23, and the annular projection 23a fits in an annular groove 1a formed on the outer circumference of the tube 1.

Consequently, a lower end portion of the increased diameter member 21 is fastened and joined to the outer circumference of the tube 1. This blocks positional displacement of the increased diameter member 21 caused by, for example, vibration during operation of the shock absorber 200.

Figure 8:
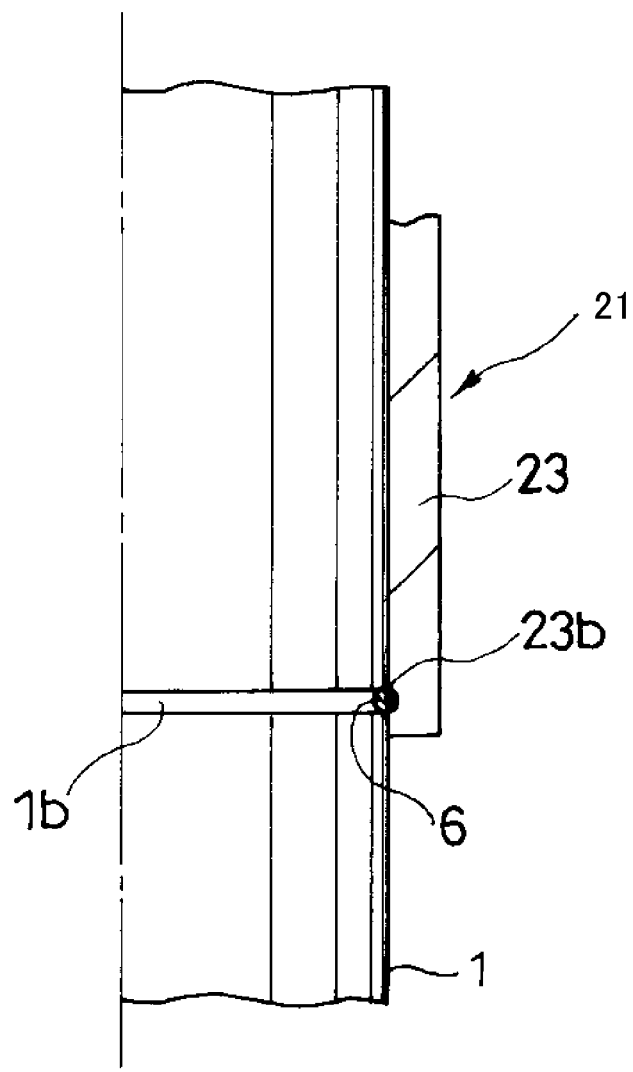
FIG. 8 is a partial lateral cross-sectional view showing a state where the increased diameter member is joined to the tube.

FIG. 8 shows another method of joining the lower end portion of the increased diameter member 21 to the outer circumference of the tube 1. An annular groove 1b is formed on the outer circumferential surface of the tube 1, and a retaining ring 6 fits in the annular groove 1b. An annular groove 23b formed on the inner side of the lower end portion of the main body part 23 fits on the retaining ring 6. In FIG. 8, illustration of the lower spring bearing 2 is omitted.

The method shown in FIG. 8 requires an additional component, i.e., the retaining ring 6. However, the annular groove 1b formed on the outer circumference of the tube 1 is shallower than the annular groove 1a shown in FIG. 7. This is advantageous in ensuring the strength of the tube 1.

In a case where the lower end portion of the increased diameter member 21 is fastened to and hence aggressively joined to the outer circumference of the tube 1, it is possible to block the increased diameter member 21 from coming off the tube 1. The same goes for the increased diameter member 20 shown in FIG. 5. That is to say, a lower end portion of the increased diameter member 20 may be fastened and joined to the outer circumference of the tube 1. This is effective especially in a case where the increased diameter member 20 is not held between the lower spring bearing 2 and the bump stopper 4.

The foregoing second embodiment achieves the following effects.

The increased diameter member 20, 21, which is formed as a tube or a bottomed tube along the axial direction of the tube 1, is provided on the outer circumference of the tube 1. Therefore, even if the lower end portion S1 of the broken suspension spring S attempts to move toward the tire T, the lower end portion S1 of the broken suspension spring S comes into contact with the increased diameter member 20, 21 and is prevented from moving toward the tire T. Consequently, interference of the lower end portion S1 of the broken suspension spring S with the tire T is avoided.

Third Embodiment

A shock absorber 300 according to a third embodiment of the present invention will now be described with reference to FIG. 9. In the present third embodiment, constituents that are the same as those of the shock absorber 100 according to the above-described first embodiment are given the same reference signs thereas in the drawings, and a description thereof is omitted. The following describes differences from the above-described first embodiment.

Figure 9:
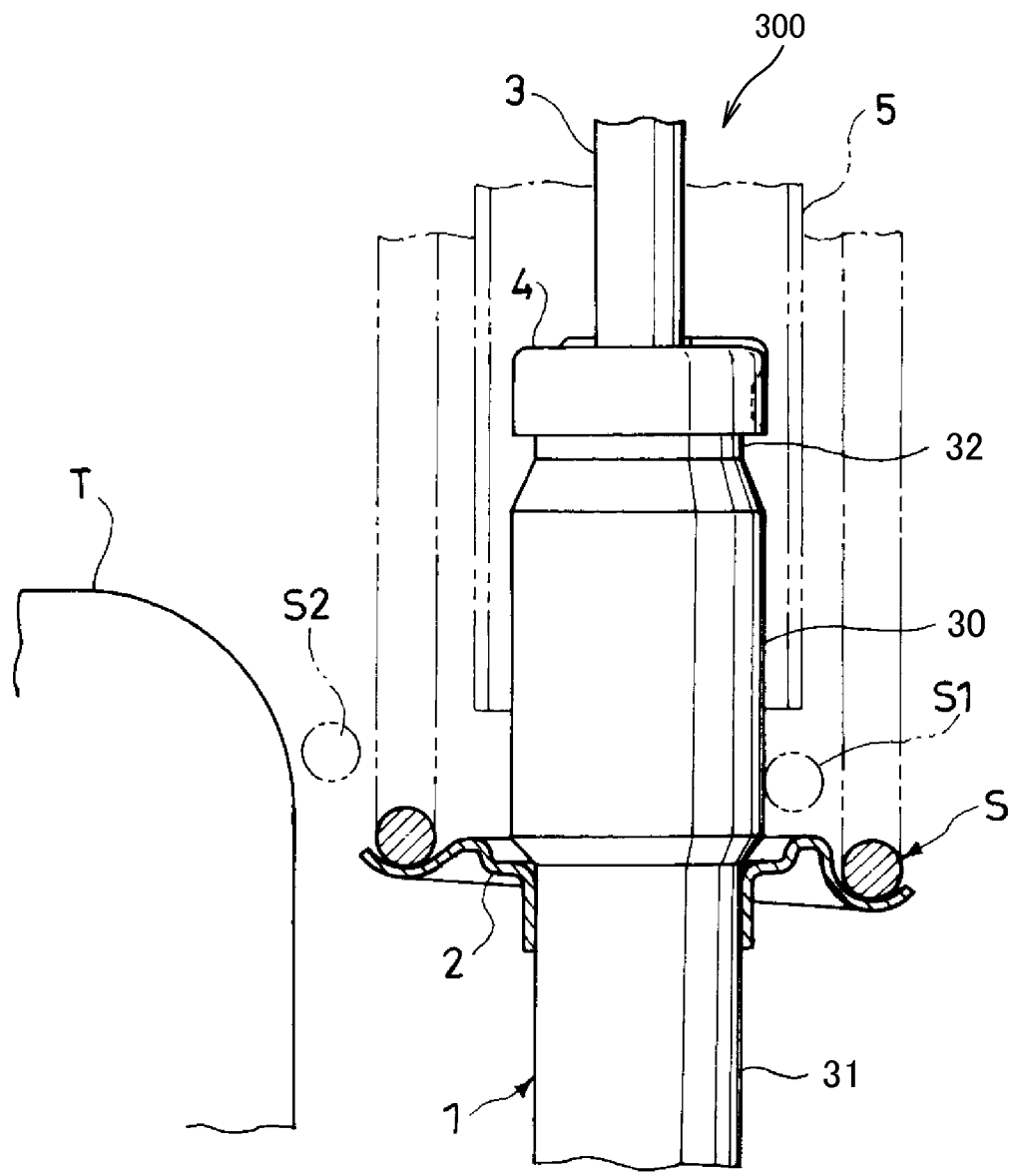
FIG. 9 is a partial side view of a shock absorber according to a third embodiment of the present invention.

As shown in FIG. 9, an increased diameter part 30 is formed on an outer circumference of a tube 1 of the shock absorber 300, specifically, on an outer circumferential surface of the tube 1 above a lower spring bearing 2. The increased diameter part 30 has an outer diameter larger than an outer diameter of the tube 1 on which the lower spring bearing 2 is provided.

In a general shock absorber, an outer diameter of the tube 1 above the lower spring bearing 2 is the same as an outer diameter of a part of the tube 1 on which the lower spring bearing 2 is provided, and as an outer diameter of the tube 1 therebelow.

In contrast, in the shock absorber 300, the increased diameter part 30 that has a larger diameter than other parts of the tube 1 is formed on the tube 1 above the lower spring bearing 2, integrally with the tube 1. In a case where a suspension spring S is shortened due to breakage of a lower end portion thereof for some reason and moves toward a tire T, the increased diameter part 30 comes into contact with a lower end portion S1 of the broken suspension spring S as indicated by a line with alternate long and two short dashes in FIG. 9, thereby preventing the suspension spring S from moving further toward the tire T.

As the increased diameter part 30 thus prevents a movement of the lower end portion S1 of the broken suspension spring S, a lower end portion S2 of the broken suspension spring S at a side opposing the tire T is prevented from moving further toward the tire T. In this way, interference of the lower end portion S2 of the broken suspension spring S with the tire T is avoided.

The increased diameter part 30 may be configured arbitrarily, as long as it prevents the broken lower end portion S1 of the suspension spring S from moving toward the tire T.

The increased diameter part 30 is formed integrally with the tube 1, and is formed by directly processing the tube 1. Therefore, formation of the increased diameter part 30 on the tube 1 does not require effort compared to a case in which an increased diameter part is formed by providing a separate member on the tube 1.

In a case where an increased diameter part is formed by providing a separate member on the tube 1, there is a possibility that the separate member comes off the tube 1 due to, for example, rust caused by age-related deterioration. However, as the increased diameter part 30 is formed integrally with the tube 1, there is no possibility that it comes off due to age-related deterioration.

In order to form a large diameter part and a small diameter part on the tube 1, a diameter expansion process (a bulging process) and a diameter reduction process (a drawing process) are used. However, a method of forming the large diameter part and the small diameter part on the tube 1 is not limited to a particular method. A wide variety of methods are known as a processing method of forming the large diameter part and the small diameter part on a single tube, and therefore a description thereof is omitted herein.

In the present embodiment, by applying a diameter expansion process to the tube 1, a part of the tube 1 above the lower spring bearing 2 is formed as the increased diameter part 30 serving as the large diameter part, and a part of the tube 1 on which the lower spring bearing 2 is provided is formed as the small diameter part 31.

An upper end small diameter part 32 is formed on the tube 1 above the increased diameter part 30. The upper end small diameter part 32 has the original diameter of the tube 1, i.e., the same outer diameter as the small diameter part 31, and composes an upper end portion of the tube 1. A bump stopper 4 is pressed onto the upper end small diameter part 32.

The outer diameter of the increased diameter part 30 may coincide with an outer diameter of the bump stopper 4. It should be noted that the outer diameter of the increased diameter part 30 may be larger than or smaller than the outer diameter of the bump stopper 4.

The outer diameter of the increased diameter part 30 is larger than the outer diameter of the small diameter part 31. Specifically, in a case where the shock absorber 300 is of a multi-tube type, the outer diameter of the increased diameter part 30 is larger than that of the small diameter part 31 by a thickness dimension that is substantially the same as a radial thickness dimension of a reservoir partitioned between the tube 1 serving as an outer tube and a cylinder inside the tube 1.

A dimension of the outer diameter of the increased diameter part 30 is such that, even if the lower end portion S1 of the broken suspension spring S moves in a radial direction of the tube 1, interference of the lower end portion S2 of the broken suspension spring S with the tire T can be avoided. Specifically, an optimal numerical value is selected thereas based on the outer diameter of the tube 1 and on a winding diameter and wire diameter of the suspension spring S. Incidentally, the dimension of the outer diameter of the increased diameter part 30 needs to be set such that an inner circumference of the suspension spring S does not interfere with an outer circumference of the increased diameter part 30 while the suspension spring S is in a normal state.

In a case where the diameter expansion process has been applied to the tube 1, an outer circumferential surface of the increased diameter part 30 is generally shaped to be concentric with the outer circumferential surface of the tube 1. However, in terms of prevention of a further movement of the lower end portion S1 of the broken suspension spring S by contact therewith, the outer circumferential surface of the increased diameter part 30 need not be concentric with the outer circumferential surface of the tube 1.

In a case where the increased diameter part 30 is formed to be concentric with the outer circumferential surface of the tube 1, the increased diameter part 30 does not have a directional property in a circumferential direction. In this case, when welding the lower spring bearing 2 to the tube 1 below the increased diameter part 30, an operation of positioning the lower spring bearing 2 in the circumferential direction is not required, thereby making a welding operation easy.

The outer circumferential surface of the increased diameter part 30 may be formed as a surface with circumferentially continuous waves, or as a polygonal surface composed of a plurality of flat surfaces. In a case where the outer circumferential surface of the increased diameter part 30 is formed into a shape other than a circumferential surface, an exterior of the tube 1 can be formed in a hobby-oriented manner.

At the time of assembly of the shock absorber 300, the lower spring bearing 2 is welded to the outer circumferential surface of the tube 1. At this time, the increased diameter part 30 is formed on the tube 1 in advance. Hence, the increased diameter part 30 serves as a benchmark for setting a fixture position of the lower spring bearing 2 when welding the lower spring bearing 2 to the tube 1.

In FIG. 9, the increased diameter part 30 is formed across a substantially entire length from the lower spring bearing 2 to the bump stopper 4. However, in terms of prevention of a movement of the lower end portion S1 of the broken suspension spring S toward the tire T, the increased diameter part 30 may be formed to be smaller in length than is illustrated. Specifically, the increased diameter part 30 may be formed such that a position of an upper end thereof is lower than is illustrated. In this way, the appearance of the tube 1 can be improved compared to a case in which the increased diameter part 30 is formed to be long.

As indicated by a line with alternate long and two short dashes in FIG. 9, a lower end portion of a dust cover 5 is positioned at an inner side of the suspension spring S. In view of this, the increased diameter part 30 functions so as to narrow a clearance between the tube 1 and the dust cover 5. Therefore, by providing the increased diameter part 30, it is possible to suppress external dust from entering.

The foregoing third embodiment achieves the following effects.

The increased diameter part 30, which has the outer diameter larger than the outer diameter of the tube 1 on which the lower spring bearing 2 is provided, is formed on the outer circumference of the tube 1. Therefore, even if the lower end portion S1 of the broken suspension spring S attempts to move toward the tire T, the lower end portion S1 of the broken suspension spring S comes into contact with the increased diameter part 30 and is prevented from moving toward the tire T. Consequently, interference of the lower end portion S1 of the broken suspension spring S with the tire T is avoided.

Embodiments of this invention were described above, but the above embodiments are merely examples of applications of this invention, and the technical scope of this invention is not limited to the specific constitutions of the above embodiments.

This application claims priorities based on Japanese Patent Application No. 2012-172728, No. 2012-172729, and No. 2012-172730 filed with the Japan Patent Office on Aug. 3, 2012, the entire contents of which are incorporated into this specification.

The invention claimed is:

1. A shock absorber comprising:
    a suspension spring;
    a tube having a lower end portion joined to a vehicle axle side portion provided with a tire;
    a lower spring bearing that is provided on an outer circumference of the tube and supports a lower end of the suspension spring; and
    a plate member provided on the outer circumference of the tube above the lower spring bearing, the plate member having an outer diameter larger than an outer diameter of the tube,
    wherein the plate member is provided on a surface on the outer circumference of the tube at a side facing away from the tire,
    wherein the lower spring bearing is arranged lower than an upper end portion of the tire in an axial direction of the tube, and
    wherein a length from an outer circumferential surface of the plate member to an inner periphery of the suspension spring facing the outer circumferential surface of the plate member in the radial direction of tube is shorter than a length from an outer periphery of the suspension spring facing the tire to the tire in the radial direction of the tube.
2. The shock absorber according to claim 1, wherein
    the plate member is provided on, out of an outer circumferential surface of the tube, only a surface at a side opposite to a surface opposing the tire.

3. The shock absorber according to claim 1, wherein the plate member is formed along an axial direction of the tube.

4. The shock absorber according to claim 1, wherein the plate member is made of metal and welded to the tube.

5. The shock absorber according to claim 1, wherein the plate member is provided in such a manner that a lower end thereof is in contact with the lower spring bearing.

6. A shock absorber, comprising:
a suspension spring;
a tube whose lower end portion is joined to a vehicle axle side portion provided with a tire;
a lower spring bearing that is provided on an outer circumference of the tube and supports a lower end of the suspension spring; and
a plate member provided on the outer circumference of the tube above the lower spring bearing, the plate member having an outer diameter larger than an outer diameter of the tube,
wherein the plate member is provided on, out of an outer circumferential surface of the tube, a surface at a side opposite to a surface opposing the tire,
wherein the lower spring bearing is arranged lower than an upper end portion of the tire in an axial direction of the tube, and
wherein the plate member having a downward axially-facing surface contacting an upward axially-facing surface of the lower spring bearing.

7. A shock absorber, comprising:
a suspension spring;
a tube whose lower end portion is joined to a vehicle axle side portion provided with a tire;
a lower spring bearing that is provided on an outer circumference of the tube and supports a lower end of the suspension spring; and
a plate member provided on the outer circumference of the tube above the lower spring bearing, the plate member having an outer diameter larger than an outer diameter of the tube,
wherein the plate member is provided on, out of an outer circumferential surface of the tube, a surface at a side opposite to a surface opposing the tire,
wherein the lower spring bearing is arranged lower than an upper end portion of the tire in an axial direction of the tube, and
wherein the plate member comprises a downward axially-facing surface, the downward axially-facing surface is arranged higher than an upward axially-facing surface of the lower spring bearing, and the downward axially-facing surface is arranged lower than the upper end portion of the tire in an axial direction of the tube.

* * * * *